April 22, 1958      E. J. DOYLE      2,832,069
CIRCUIT CONTINUITY INDICATOR
Filed Sept. 25, 1956
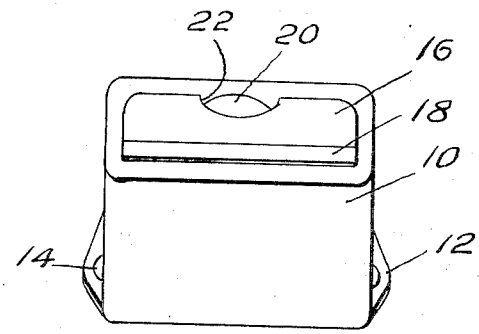
Fig-1-
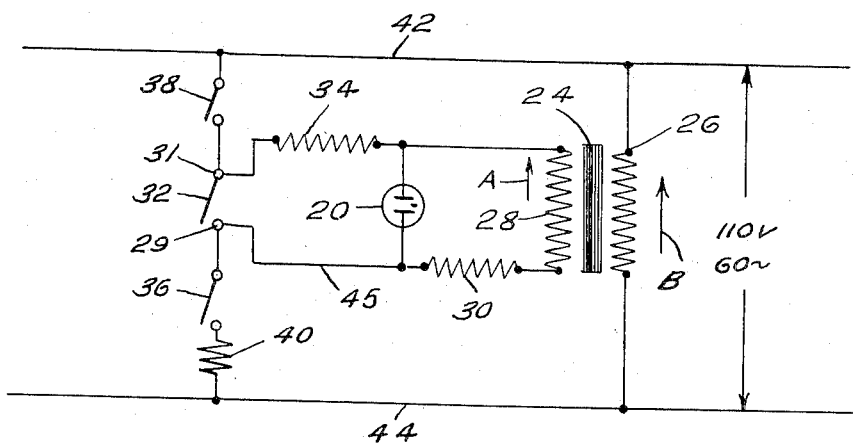
Fig-2-
INVENTOR.
Edward J. Doyle
BY
ATTORNEY.

_United States Patent Office_

2,832,069
Patented Apr. 22, 1958

2,832,069

CIRCUIT CONTINUITY INDICATOR

Edward J. Doyle, Rochester, N. Y.

Application September 25, 1956, Serial No. 611,855

3 Claims. (Cl. 340—252)

This invention relates to an electrical circuit continuity indicator, and more particularly to an indicator adapted for reliably indicating the status of a switch.

Control circuits of complex nature as to number of switches utilize switches of the micro switch type, which by reason of their enclosed structure or inaccessible location in the circuit are difficult or impossible to inspect for operability. Certain of such switches, should they fail might have disastrous results. It is therefore desirable that a reliable inexpensive indicator be provided which will indicate positively the condition of a switch, as to whether it is opened or closed, and which will not affect the circuit to which it is applied, and which will directly be responsive to whether the switch contacts establish a closed or open circuit.

An object of the invention is to provide such an indicator which can be directly connected across the contacts of a switch, whose operability is important, without disturbing the electrical contacts of the circuit.

A further object of the invention is to provide a visual indicator suitable for panel mounting which will be inexpensive, reliable, use negligible current, and which will instantly indicate a change in the condition of a switch, and at all times indicate whether the switch is open or closed.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a perspective view of the switch indicator unit; and

Figure 2 is a circuit showing the indicator and its application to a typical circuit.

Referring to the drawings, the casing 10, which may be formed of light sheet metal, is provided with attachment flanges 12 and 14, for securing to a panel. A hollow protecting shell 16 is provided on its upper face 18, for a neon lamp 20, the illumination of which may be observed through the aperture 22.

Within the casing is positioned an isolating transformer 24, having a primary 26 and secondary 28. The secondary is connected to the neon lamp 20 through a high resistance 30 also located in the casing. The neon lamp is connected to the opposite terminals 29 and 31 of a switch 32, which may be of the precision snap action type, such as a micro switch, through a high resistor 34, also located in the casing. As many units comprising a transformer 24, resistors 30, 34, and indicating lamp 20 may be provided as there are switches, and but one unit is shown for illustrative purposes across switch 32. For example, another unit may be connected across switch 36, and a like unit connected across switch 38 if information as to the condition of such switches is important. The switches 32, 36 and 38 are arranged in series with a load 40, which may be a motor, solenoid or other device, and connected across the line wires 42 and 44.

In practice, if the line wires 42 and 44 are 110 volt, 60 cycle alternating current, the transformer primary and secondary ratio may be approximately 1:1, and the resistor 30 may be in the order of 100,000 ohms, the resistor being chosen to provide the necessary current to maintain ionization and illumination of the lamp 20, when the circuit through resistor 34 and return lead 45 is open. The resistor 34 may be in the order of 47,000 ohms. When the switch 32 is closed, the shunt effect of resistor 34 is such as to reduce the potential drop across the glow discharge tube 20, below the critical, so that the lamp is extinguished.

If switch 38, and switch 36 were closed, and switch 32 open, full line potential of 110 volts would be applied across the terminals 29 and 31. To prevent this potential from effecting operation of the lamp, the polarity of the transformer secondary in reference to the primary should preferably be oriented so that the line voltage and secondary voltage are in phase, which is simultaneously indicated by arrows A and B. Under such conditions, the line potential will act in parallel with the secondary potential to increase the current flow in the glow discharge tube, with the only result being brighter illumination.

Should switch 32 be closed under these circumstances, however, the shunt effect across the tube 20, will effect the desired potential drop, sufficient to terminate the glow discharge, since at such time, the secondary 28 is the sole source of potential to the lamp, and the closed switch 32 and resistor 34 provides a positive shunt across the neon lamp 20 to effectively drop the voltage across the lamp to a value below the critical voltage, it being understood that the high resistor 30 effectively limits the current, so as to assure the necessary potetnial drop across the lamp. Thus the resistor 30 is so chosen as to limit the current to the lamp 20 for illumination purposes, when the circuit through resistor 34 and lead 45 is open, and further so chosen to limit the current flow to reduce the potential across the lamp to extinguish the same, as soon as the shunt of resistor 34 is placed across the lamp as a result of the closure of the contacts of switch 32. The overall current flow in either of the resistors 30 or 34 is negligible and has no undesirable effect upon the circuit including the load 40.

It will be seen from the foregoing that a reliable indication is provided, which can be located at a distance from the switch whose condition is of importance, and that the indicator is relatively inexpensive. In fact, by reason of the low current consumption, the indicator can be located at almost any distance from the actual switch.

Although a typical circuit embodying a switch has been shown and resistor values have been given, such values are illustrative. The resistors are disposed on opposite sides of the secondary to prevent any possible direct connection to the secondary from the switch to which the indicator is connected, except as through the indicator discharge tube 20.

While a single embodiment of the invention has been illustrated and described, it is to be understood that the invention is not limited thereto. As various changes in the construction, arrangement and adaptation may be made without departing from the spirit of the invention, as will be apparent to those skilled in the art, reference will be had to the appended claims for a definition of the limits of the invention.

What is claimed is:

1. An indicator for the condition of a switch in an electrical circuit comprising an isolating transformer having a primary and a secondary, a circuit connected to the terminals of said secondary comprising a relatively high current limiting resistor and a glow discharge indicator connected in series, said resistor limiting the current flow to said glow discharge indicator from said secondary, and affording a potential drop less than that required to ionize the indicator, and leads from the opposite terminals of said glow discharge indicator adapted to be connected across the contacts of a switch, one of said leads from the indicator terminal opposite from that to which the first resistor is connected having interposed therein a second current limiting resistor, said second-named current limiting resistor being of a value such that when shunted across said indicator the potential across said indicator is reduced below that required for maintaining glow discharge.

2. An indicator for the condition of a switch in an electrical circuit comprising an isolating transformer having a primary and a secondary, a circuit connected to the terminals of said secondary comprising a relatively high current limiting resistor and a glow discharge indicator connected in series, said resistor limiting the current flow to said glow discharge indicator from said secondary, and affording a potential drop less than that required to ionize the indicator, leads from the opposite terminals of said glow discharge indicator adapted to be connected across the contacts of a switch, one of said leads from the indicator terminal opposite from that to which the first resistor is connected having interposed therein a second current limiting resistor, said second-named current limiting resistor being of a value such that when shunted across said indicator the potential across said indicator is reduced below that required for maintaining glow discharge, and a circuit including a switch having contacts adapted to be opened or closed, each of said leads being connected to one of said contacts respectively.

3. An indicator for the condition of a switch in an electrical circuit comprising an isolating transformer having a primary and a secondary winding, a circuit connected to the terminals of said secondary winding comprising a relatively high current limiting resistor and a glow discharge indicator connected in series, said resistor limiting the current flow to said glow discharge indicator, and affording a potential drop less than that required to ionize the indicator, leads connected to the opposite terminals of said glow discharge indicator adapted to be connected across the contacts of a switch, one of said leads from the indicator terminal opposite from that to which the first resistor is connected having interposed therein a second current limiting resistor, said second-named current limiting resistor being of a value such that when shunted across said indicator the potential across said indicator is reduced below that required for maintaining glow discharge, and a load circuit connected across a pair of line wires leading to a source of alternating current potential, said load circuit including a switch having contacts adapted to be opened and closed, and each of said leads being connected to one of said contacts respectively, said primary being connected across said line wires, and said load circuit and said primary being so connected across said line wires whereby the secondary voltage across said indicator, and the line voltage across said contacts when open through said load circuit, are substantially in phase.

References Cited in the file of this patent

UNITED STATES PATENTS

| | | |
|---|---|---|
| 2,522,930 | Chakiris | Sept. 19, 1950 |
| 2,753,548 | Gates | July 3, 1956 |